(12) United States Patent
Venkatraman et al.

(10) Patent No.: US 10,856,119 B2
(45) Date of Patent: Dec. 1, 2020

(54) METHOD AND APPARATUS FOR REQUESTING A TRANSPORT VEHICLE FROM A MOBILE DEVICE

(71) Applicant: QUALCOMM Incorporated, San Diego, CA (US)

(72) Inventors: Sai Pradeep Venkatraman, Santa Clara, CA (US); Meghna Agrawal, Cupertino, CA (US); Weihua Gao, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/678,086

(22) Filed: Nov. 8, 2019

(65) Prior Publication Data

US 2020/0077239 A1   Mar. 5, 2020

Related U.S. Application Data

(62) Division of application No. 15/825,420, filed on Nov. 29, 2017, now Pat. No. 10,511,943.

(51) Int. Cl.
| | |
|---|---|
| *H04L 12/28* | (2006.01) |
| *H04W 4/40* | (2018.01) |
| *G01C 21/34* | (2006.01) |
| *H04W 4/02* | (2018.01) |
| *H04L 29/08* | (2006.01) |
| *G06T 1/00* | (2006.01) |

(Continued)

(52) U.S. Cl.
CPC .......... *H04W 4/40* (2018.02); *G01C 21/3438* (2013.01); *G01S 19/01* (2013.01); *G06Q 10/025* (2013.01); *G06Q 50/30* (2013.01); *G06T 1/0007* (2013.01); *G08G 1/202* (2013.01); *H04L 12/28* (2013.01); *H04L 67/104* (2013.01); *H04W 4/023* (2013.01); *H04W 4/029* (2018.02); *H04W 12/06* (2013.01)

(58) Field of Classification Search
CPC ........ H04W 4/40; H04W 4/029; H04L 12/28; H04L 67/104
See application file for complete search history.

(56) References Cited

U.S. PATENT DOCUMENTS

| | | | |
|---|---|---|---|
| 9,836,057 | B2 | 12/2017 | Fairfield et al. |
| 9,939,279 | B2 | 4/2018 | Pan et al. |

(Continued)

FOREIGN PATENT DOCUMENTS

| | | | | |
|---|---|---|---|---|
| GB | 2547882 A | * | 9/2017 | ............ H04W 4/029 |

OTHER PUBLICATIONS

International Search Report and Written Opinion—PCT/US2018/059549—ISA/EPO—dated Feb. 5, 2019.

*Primary Examiner* — William D Cumming

(57) ABSTRACT

Techniques are provided which may be implemented using various methods and/or apparatuses in a mobile device to request a transport vehicle. Techniques are provided which may be implemented using various methods and/or apparatuses in a transport vehicle to respond to a request from a mobile device. Various embodiments include customer and transport authentication and security techniques. Various embodiments include location update techniques to enable a transport vehicle to navigate to a mobile device, even in areas of low position accuracy for traditional GNSS and terrestrial transceiver-based systems.

15 Claims, 7 Drawing Sheets

(51) Int. Cl.
*G01S 19/01* (2010.01)
*G06Q 50/30* (2012.01)
*H04W 4/029* (2018.01)
*G08G 1/00* (2006.01)
*G06Q 10/02* (2012.01)
*H04W 12/06* (2009.01)

(56) References Cited

U.S. PATENT DOCUMENTS

| | | | |
|---|---|---|---|
| 1,011,387 | A1 | 10/2018 | Pan et al. |
| 10,511,943 | B2 * | 12/2019 | Venkatraman ........ H04L 67/104 |
| 2014/0323160 | A1 | 10/2014 | Venkatraman et al. |
| 2015/0181384 | A1 | 6/2015 | Mayor et al. |
| 2016/0203576 | A1 | 7/2016 | Novak et al. |
| 2016/0364812 | A1 | 12/2016 | Cao et al. |
| 2017/0075358 | A1 | 3/2017 | Zhang et al. |
| 2017/0127230 | A1 | 5/2017 | Enriquez et al. |
| 2017/0228709 | A1 | 8/2017 | Dhaliwal et al. |
| 2017/0293950 | A1 | 10/2017 | Rathod |
| 2017/0299724 | A1 | 10/2017 | Hsu et al. |
| 2017/0327082 | A1 | 11/2017 | Kamhi et al. |
| 2017/0372410 | A1 | 12/2017 | Fruhman et al. |
| 2018/0096297 | A1 | 4/2018 | Ghatage et al. |
| 2018/0096300 | A1 | 4/2018 | Boye et al. |
| 2018/0107967 | A1 | 4/2018 | Bulcao et al. |
| 2018/0121847 | A1 | 5/2018 | Zhao et al. |
| 2018/0322443 | A1 | 11/2018 | Barrington et al. |
| 2019/0166473 | A1 * | 5/2019 | Venkatraman ........... H04L 12/28 |
| 2020/0077239 | A1 * | 3/2020 | Venkatraman ........... H04L 12/28 |

* cited by examiner

METHOD AND APPARATUS FOR REQUESTING A TRANSPORT VEHICLE FROM A MOBILE DEVICE

RELATED APPLICATIONS

This application is a divisional of U.S. application Ser. No. 15/825,420 granted as U.S. Pat. No. 10,511,943, filed Nov. 29, 2017, entitled "Method and Apparatus for Requesting a Transport Vehicle from a Mobile Device," which is assigned to the assignee hereof and incorporated herein by reference in its entirety.

BACKGROUND

1. Field

The subject matter disclosed herein relates to electronic devices, and more particularly to methods and apparatuses for use in or with a mobile device to facilitate the request of a transport vehicle and secure entry into the transport vehicle using a mobile phone.

2. Information

Self-driving cars enable automation of the transportation industry. However, car navigation traditionally provides street level lane level accuracy. Navigating a transport vehicle to a potential passenger, detecting the correct potential passenger in a crowd, and securely enabling entry of a potential passenger into the transport would need to be addressed to enable driverless transport vehicles and to enhance the safety and convenience of transport vehicles with drivers.

SUMMARY

Some example techniques are presented herein which may be implemented in various method and apparatuses in a mobile device to request and to securely enter a transport vehicle. In various embodiments, mobile devices may be used to request a transport vehicle. In various embodiments, the transport vehicle may be driverless. In various embodiments, the control, navigation, location of the potential passenger and secure entry of the potential passenger into the transport vehicle may be automated.

In accordance with an example implementation, a method may be provided which comprises, determining, by a mobile device, a location of the mobile device; sending the location of the mobile device and a request for pickup to a dispatch server; receiving a first transport identifier and a response code from the dispatch server; receiving a second transport identifier from the transport vehicle; determining that the first transport identifier and the second transport identifier correspond; and sending the response code to the transport vehicle in response to a determination that the first transport identifier and the second transport identifier correspond. It is understood that corresponding may comprise matching between the first transport identifier and the second transport identifier, or containing some relationship between the first transport identifier and the second transport identifier, such as the second transport identifier being a derivative of the first transport identifier or, the second transport identifier being an encoded form of the first transport identifier or the second transport identifier being based on the first transport identifier, or vice versa.

In accordance with another example implementation, an apparatus may be provided for use in a mobile device comprising: means for determining, by the mobile device, a location of the mobile device; means for sending the location of the mobile device and a request for pickup to a dispatch server; means for receiving a first transport identifier and a response code from the dispatch server; means for receiving a second transport identifier from the transport vehicle; means for determining that the first transport identifier and the second transport identifier correspond; and means for sending the response code to the transport vehicle.

In accordance with yet another example implementation, a mobile device may be provided which comprises: one or more processing units; a first wireless transceiver coupled to the one or more processing units; and a second wireless transceiver coupled to the one or more processing units; wherein the one or more processing units are configured to: determine a location of the mobile device; send, using the first wireless transceiver, the location of the mobile device and a request for pickup to a dispatch server; receive, using the first wireless transceiver, a first transport identifier and a response code from the dispatch server; receive, using the second wireless transceiver, a second transport identifier from the transport vehicle; determine that the transport identifier from the dispatch server and the transport identifier from the transport vehicle correspond; and send, using the second wireless transceiver, the response code to the transport vehicle.

In accordance with an example implementation, a method may be provided which comprises: receiving a pickup request, a location of a mobile device and a response code from a dispatch server; navigating to the location of the mobile device or to a proximal location thereof; sending a transport identifier code to the mobile device; receiving the response code from the mobile device; and enabling door access to a transport vehicle.

In accordance with another example implementation, an apparatus may be provided for use in a mobile device. The apparatus may comprise: means for receiving the pickup request, a location of the mobile device and a response code from a dispatch server; means for navigating to the location of the mobile device or to a proximal location thereof; means for sending a transport identifier code to the mobile device; means for receiving the response code from the mobile device; and means for enabling door access to the transport vehicle.

In accordance with yet another example implementation, a mobile device may be provided which comprises: one or more processing units; a first wireless transceiver coupled to the one or more processing units; and a second wireless transceiver coupled to the one or more processing units; wherein the one or more processing units are configured to: receive, using the first wireless transceiver, a pickup request, a location of a mobile device and a response code from a dispatch server; navigate, using a navigation system, to the location of the mobile device or to a proximal location thereof; send, using the second wireless transceiver, a transport identifier code to the mobile device; receive, using the second wireless transceiver, the response code from the mobile device; and enable, using a security system on a transport vehicle, door access to the transport vehicle.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Some example techniques are presented herein which may be implemented in various methods, means and apparatuses in a mobile device and in a crowd sourcing and information delivery system. Example techniques presented herein address various methods and apparatuses in a mobile device to provide for or otherwise support the request of a transport vehicle from a mobile device and mobile device and/or customer authentication prior to entry into the transport vehicle. Example techniques described herein may generally apply to the request and utilization of driverless vehicles from mobile devices. Example techniques and embodiments are provided for requesting transport vehicles and for locating, identifying and/or authenticating potential passengers.

In the case of a driverless transport vehicle, or a computer assisted, but driven transport vehicle, the navigation, radio and camera and/or vision functions may be utilized to enhance the ability to navigate the remaining distance between an address or latitude and longitude-based location and the actual location of a potential passenger. For example, an address may comprise a large area, such as a city block, a street intersection or multiple buildings. Furthermore, in dense urban scenarios or in areas with signal obstructions such as sky scrapers or obstructive terrain (tunnels, canyons, hills, etc.), GNSS location accuracy degrades significantly. Thus, in these scenarios, the location provided by an application on a mobile phone using GNSS-based location, may contain significant error due to signal blockage by skyscrapers and high-rise buildings and signal multi-path. Terrestrial-based location such as WAN-based location and Wi-Fi-based location, using signals from WAN, WLAN and PAN transceivers may also contain significant error, such as that contributed by inaccurate transceiver locations or that caused by multipath (affecting timing and delay-based ranging techniques) and building penetration losses (affecting signal strength-based ranging techniques).

If there is only one potential passenger, particularly if the location error is relatively small, the match between a transport vehicle and a potential passenger is a simple one. However, if there are multiple potential passengers or if the error is large, determining which potential passenger requested the transport can be difficult. Furthermore, preventing other potential customers from taking a cab that was requested by a different party is difficult. Also, determining that a customer is credit-worthy and not a hazard to other passengers or to a driver is also a challenge. As we progress to driverless cars, these issues are exacerbated, as there may be no human involvement to communicate with and locate the requesting potential passenger.

Figure 1:
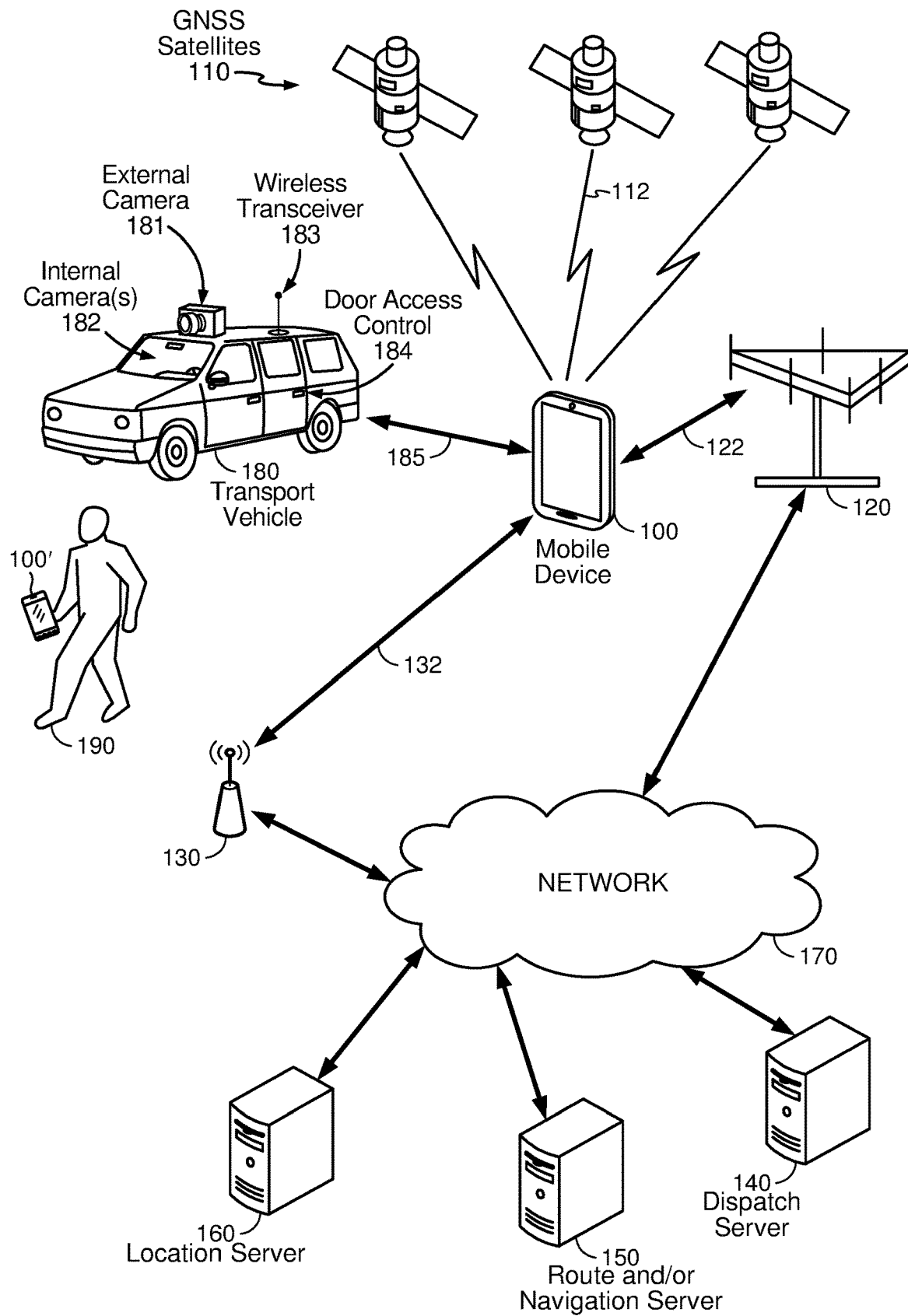
FIG. 1 is a system diagram including wireless-capable mobile devices, wireless-capable transport vehicles and network-based servers.
Figure 2:
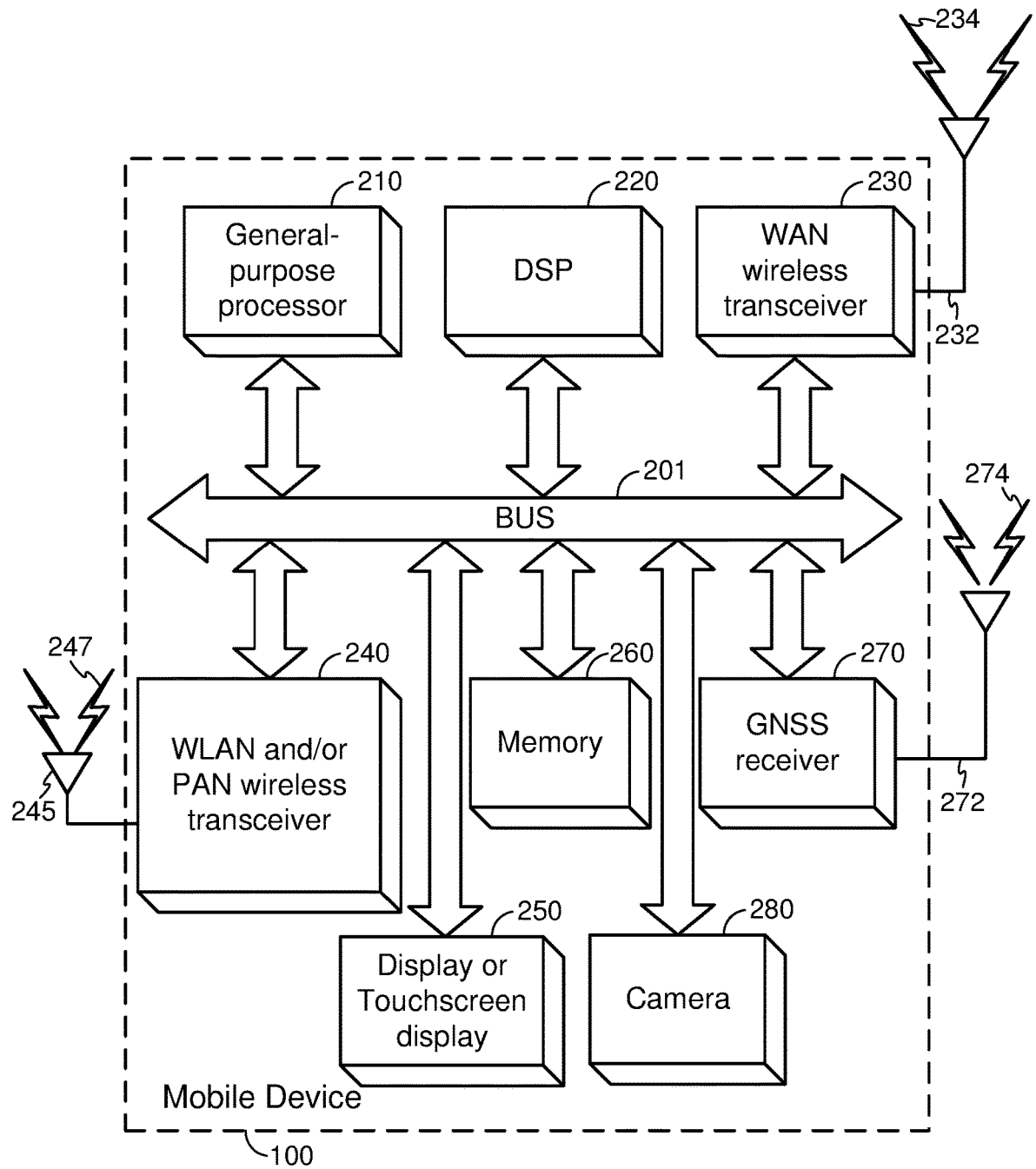
FIG. 2 is an exemplary mobile device capable of sending and receiving wireless signals and of determining the location of the mobile device.

FIG. 1 illustrates a system and means for implementing the various methods and techniques described in the figures and text herein. As shown in FIG. 2, in an embodiment, mobile device 100, which may also be referred to as a UE (or user equipment), may transmit radio signals to, and receive radio signals from, a wireless communication network. In one example, mobile device 100 may communicate, via wide area network (WAN) wireless transceiver 120 and wireless antenna 232 with a cellular communication network by transmitting wireless signals to, or receiving wireless signals from a WAN wireless transceiver 120 which may comprise a wireless base transceiver subsystem (BTS), a Node B or an evolved NodeB (eNodeB) or a next generation NodeB (gNodeB) over wireless communication link 122. Similarly, mobile device 100 may transmit wireless signals to, or receive wireless signals from local transceiver 130 over wireless communication link 132, for example, by using wireless local area network (WLAN) and/or personal area network (PAN) wireless transceiver 240 and antenna 245. In an embodiment, local transceiver 130 may be a WLAN access point, a Bluetooth transceiver, a ZigBee transceiver, or other WLAN or PAN transceiver. In an embodiment, mobile device 100 may transmit wireless signals to, or receive wireless signals from a wireless transceiver 183 on a transport vehicle 180 over wireless communication link 185. In an embodiment, communication link 185 may be a WAN, WLAN or PAN communication link, for example, utilizing a WLAN and/or PAN wireless transceiver 240 or a WAN wireless transceiver 230 in mobile device 100 and similarly utilizing a WLAN and/or PAN wireless transceiver 440 or a WAN wireless transceiver 430 in transport vehicle 400, as illustrated by wireless transceiver 183 in FIG. 1. A local transceiver 130, a WAN wireless transceiver 120 and/or a mobile wireless transceiver 183 may comprise an access point (AP), femtocell, Home Base Station, small cell base station, Home Node B (HNB), Home eNodeB (HeNB) or next generation NodeB (gNodeB) and may provide access to a wireless local area network (WLAN, e.g., IEEE 802.11 network), a wireless personal area network (PAN, e.g., Bluetooth® network) or a cellular network (e.g. an LTE network or other wireless wide area network such as those discussed in the next paragraph). Of course, it should be understood that these are merely examples of networks that may communicate with a mobile device over a wireless link, and claimed subject matter is not limited in this respect. It is also understood that wireless transceiver 183 may be located on various transport vehicles 180 boats, ferries, cars, buses, drone and various transport vehicles. In an embodiment, the transport vehicle 180 may be utilized for passenger transport; in another embodiment, the transport vehicle 180 may be utilized for package transport, for example, via car or via drone. In an embodiment, GNSS signals 112 from GNSS Satellites 110 are utilized by mobile device 100 and/or by transport vehicle 180 for location determination. In an embodiment, signals 122 from WAN transceiver(s) 120 and signals 132 from WLAN and/or PAN local transceivers 130 are used for location determination, alone or in combination with GNSS signals 112. In an embodiment, potential passenger 190 has a mobile device 100', an embodiment of mobile device 100, which may be utilized to request a transport vehicle 180. In an embodiment, transport vehicle 180 may have external camera(s) 181 which may be used for navigation and/or for identification of potential passenger 190. In an embodiment, external camera 181 may be utilized with navigation system 450 on transport vehicle 180 (see FIG. 4). In an embodiment, internal camera(s) 182 may be utilized to authenticate or otherwise identify potential passenger 190 for example, for purposes of engaging the door access control 184, for example by using security system 420, to allow entry to the transport vehicle 180. In an embodiment, wireless transceiver 183 may be a plurality of transceivers; for example, including a WAN transceiver(s) and/or WLAN transceiver(s) to communicate with location server 160, route and/or navigation server 150, and/or dispatch server 140 via network 170.

Examples of network technologies that may support wireless transceiver 230 and WAN wireless transceiver 120 are Global System for Mobile Communications (GSM), Code Division Multiple Access (CDMA), Wideband CDMA (WCDMA), Long Term Evolution LTE), $5^{th}$ Generation Wireless (5G) or New Radio Access Technology (NR), High Rate Packet Data (HRPD). GSM, WCDMA and LTE are technologies defined by 3GPP. CDMA and HRPD are technologies defined by the $3^{rd}$ Generation Partnership Project 2 (3GPP2). WCDMA is also part of the Universal Mobile Telecommunications System (UMTS) and may be supported by an HNB. WAN wireless transceivers 120 may comprise deployments of equipment providing subscriber access to a wireless telecommunication network for a service (e.g., under a service contract). Here, a WAN wireless transceiver 120 may perform functions of a wide area network (WAN) or cell base station in servicing subscriber devices within a cell determined based, at least in part, on a range at which the WAN wireless transceiver 120 is capable of providing access service. Examples of WAN base stations include GSM™, WCDMA™, LTE™, CDMA™, HRPD™, WiFi™, BT, WiMax™, and/or $5^{th}$ Generation (5G) base stations. In an embodiment, further wireless transceiver 230 may comprise a wireless LAN (WLAN) and/or PAN transceiver. In an embodiment, mobile device 100 may contain multiple wireless transceivers including WAN, WLAN and/or PAN transceivers. In an embodiment, radio technologies that may support wireless communication link or links (wireless transceiver 240) further comprise Wireless local area network (e.g., WLAN, e.g., IEEE 802.11), Bluetooth™ (BT) and/or ZigBee™.

In an embodiment, mobile device 100, using wireless transceiver(s) 230, may communicate with servers 140, 150 and/or 160 over a network 170 through communication interface(s) 308. Here, network 170 may comprise any combination of wired or wireless connections and may include WAN wireless transceiver 120 and/or local transceiver 130 and/or servers 140, 150 and/or 160. In an embodiment, network 170 may comprise Internet Protocol (IP) or other infrastructure capable of facilitating communication between mobile device 100 and servers 140, 150 and/or 160 through local transceiver 130 or WAN wireless transceiver 120. In an embodiment, network 170 may comprise cellular communication network infrastructure such as, for example, a base station controller or packet based or circuit based switching center (not shown) to facilitate mobile cellular communication with mobile device 100. In an embodiment, network 170 may comprise local area network (LAN) elements such as Wi-Fi APs, routers and bridges and may in that case include or have links to gateway elements that provide access to wide area networks such as the Internet. In other implementations, network 170 may comprise a LAN and may or may not have access to a wide area network but may not provide any such access (if supported) to mobile device 100. In some implementations, network 170 may comprise multiple networks (e.g., one or more wireless networks and/or the Internet). In one implementation, network 170 may include one or more serving gateways or Packet Data Network gateways. In addition, one or more of servers 140, 150 and/or 160 may be a route and/or navigation server, a crowd source server, and/or a location server.

In an embodiment, location server 160 may provide assistance data to mobile device 100 and/or transport vehicle 180 to enable or enhance the ability of mobile device 100 and/or transport vehicle 180 to determine its location. In an embodiment, location server 160 may determine the location of mobile device 100 and/or transport vehicle 180 based upon signals, photos, sensor input or other data obtained at the mobile device 100 or at the transport vehicle 180.

In an embodiment, route and/or navigation sever 150 may determine and provide routing information to mobile device 100 and/or transport vehicle 180. In an embodiment, route and/or navigation sever 150 may provide routing instructions to transport vehicle 180 from its current location to the location of mobile device 100 or to other requested locations. In an embodiment, route and/or navigation sever 150 may provide routing instructions to mobile device 100 from its current location to a requested location. In an embodiment, route and/or navigation calculations may be determined directly on transport vehicle 180 or on mobile device 100.

In an embodiment, the location of the mobile device 100 may be provided to the dispatch server 140 from mobile device 100. In an embodiment, dispatch sever 140 may provide the location of mobile device 100 to route and/or navigation sever 150 or may provide the location of mobile device 100 directly to transport vehicle 180, which may subsequently request a route between the current location of transport vehicle 180 and the location of mobile device 100. In an embodiment, dispatch sever 140 may send to or receive from mobile device 100 and/or send to or receive from transport vehicle 180 the location of mobile device 100, one or more photo(s) of one or more potential passengers 190 requesting pickup, one or more photo(s) of the environment surrounding the potential passenger(s) requesting pickup, potential passenger identification information, potential passenger financial transaction information (such as credit card or charge amount, distance traveled, and/or elapsed time), authentication information, photo or photos of the transport vehicle 180, photo(s) of the environment surrounding transport vehicle 180, updated location(s) of mobile device 100 and/or various responses thereto.

In various embodiments, and as discussed below, mobile device 100 may have circuitry and processing resources capable of obtaining location related measurements (e.g. for signals received from GPS, GNSS or other Satellite Positioning System (SPS) satellites 110, WAN wireless transceiver 120 or WLAN or PAN local transceiver 130 and possibly computing a position fix or estimated location of mobile device 100 based on these location related measurements. In some implementations, location related measurements obtained by mobile device 100 may be transferred to a location server such as an enhanced serving mobile location center (E-SMLC) or SUPL location platform (SLP) (e.g. location sever 160) after which the location server may estimate or determine a location for mobile device 100 based on the measurements. In the presently illustrated example, location related measurements obtained by mobile device 100 may include measurements of signals (112) received from satellites belonging to an SPS or Global Navigation Satellite System (GNSS) (110) such as GPS, GLONASS, Galileo or Beidou and/or may include measurements of signals (such as 122 and/or 132) received from terrestrial transmitters fixed at known locations (e.g., such as WAN wireless transceiver 120). Mobile device 100 or a location server 160 may then obtain a location estimate for mobile device 100 based on these location related measurements using any one of several position methods such as, for example, GNSS, Assisted GNSS (A-GNSS), Advanced Forward Link Trilateration (AFLT), Observed Time Difference of Arrival (OTDOA) or Enhanced Cell ID (E-CID), network triangulation, Received Signal Strength Indication (RSSI) or combinations thereof. In some of these techniques (e.g. A-GNSS, AFLT and OTDOA, RSSI), pseudoranges, ranges or timing differences may be measured at mobile device 100 relative to three or more terrestrial transmitters at known locations or relative to four or more satellites with accurately known orbital data, or combinations thereof, based at least in part, on pilots, positioning reference signals (PRS) or other positioning related signals transmitted by the transmitters or satellites and received at mobile device 100. Here, servers 140, 150 or 160 may be capable of providing positioning assistance data to mobile device 100 including, for example, information regarding signals to be measured (e.g., signal timing and/or signal strength), locations and identities of terrestrial transmitters, and/or signal, timing and orbital information for GNSS satellites to facilitate positioning techniques such as A-GNSS, AFLT, OTDOA and E-CID. For example, servers 140, 150 or 160 may comprise an almanac which indicates locations and identities of wireless transceivers and/or local transceivers in a particular region or regions such as a particular venue, and may provide information descriptive of signals transmitted by a cellular base station or AP or mobile terrestrial transceiver such as transmission power and signal timing. In the case of E-CID, a mobile device 100 may obtain measurements of signal strengths for signals received from WAN wireless transceiver 120 and/or wireless local area network (WLAN) or PAN local transceiver 130 and/or may obtain a round trip signal propagation time (RTT) between mobile device 100 and a WAN wireless transceiver 120 or wireless local transceiver 130. A mobile device 100 may use these measurements together with assistance data (e.g. terrestrial almanac data or GNSS satellite data such as GNSS Almanac and/or GNSS Ephemeris information) received from a location server 160 to determine a location for mobile device 100 or may transfer the measurements to a location server 160 to perform the same determination.

In various embodiments, location may be determined through various means, as described above. For example, in an embodiment, the mobile device 100 may determine its location with GNSS satellite signal measurements, with terrestrial transmitter signal measurements or some combination thereof. In an embodiment, the mobile device 100 may determine its location using accelerometers and/or gyros to determine, via dead reckoning, distance and direction traveled from the last known position. In an embodiment, the mobile device 100 may determine its location using a combination of signals and sensors; for example, a location may be determined using various signal measurements from GNSS and terrestrial transmitters and then updated using dead reckoning. From a determined location, various signal measurements can be taken from visible transmitters to obtain an indication of distance of the transmitter from a determined location. The indication of distance may include signal strength or round-trip time or time of arrival or other distance estimation methods. New signal measurements may be taken at new determined locations. By combining indications of distance to any given transmitter taken from multiple locations, whether by one device or by a plurality of devices, the location of a transmitter, such as a WAN wireless transceiver 120 or WLAN or PAN local transceiver 130, may be determined. The location of the transmitter may be determined on mobile device 100 or on a crowd sourcing server or on a location server 160 or other network-based server.

A mobile device (e.g. mobile device 100 in FIG. 2) may be referred to as a device, a wireless device, a mobile terminal, a terminal, a mobile station (MS), a user equipment (UE), a SUPL Enabled Terminal (SET) or by some other name and may correspond to a cellphone, smartphone, laptop, tablet, PDA, tracking device or some other portable or moveable device. Typically, though not necessarily, a mobile device may support wireless communication such as using GSM, WCDMA, LTE, CDMA, HRPD, Wi-Fi, BT, WiMAX, Long Term Evolution (LTE), 5th Generation Wireless (5G) or new radio access technology (NR), etc. A mobile device may also support wireless communication using a wireless LAN (WLAN), personal area network (PAN) such as Bluetooth™ or ZigBee, DSL or packet cable for example. A mobile device may comprise a single entity or may comprise multiple entities such as in a personal area network where a user may employ audio, video and/or data I/O devices and/or body sensors and a separate wireline or wireless modem. An estimate of a location of a mobile device (e.g., mobile device 100) may be referred to as a location, location estimate, location fix, fix, position, position estimate or position fix, and may be geographic, thus providing location coordinates for the mobile device (e.g., latitude and longitude) which may or may not include an altitude component (e.g., height above sea level, height above or depth below ground level, floor level or basement level). Alternatively, a location of a mobile device may be expressed as a civic location (e.g., as a postal address or the designation of some point or small area in a building such as a particular room or floor). A location of a mobile device may also be expressed as an area or volume (defined either geographically or in civic form) within which the mobile device is expected to be located with some probability or confidence level (e.g., 67% or 95%). A location of a mobile device may further be a relative location comprising, for example, a distance and direction or relative X, Y (and Z) coordinates defined relative to some origin at a known location which may be defined geographically or in civic terms or by reference to a point, area or volume indicated on a map, floor plan or building plan. In the description contained herein, the use of the term location may comprise any of these variants unless indicated otherwise.

FIG. 2 illustrates an embodiment of a mobile device, a non-limiting example for implementing the various methods and techniques illustrated in the figures and text herein. As shown in FIG. 2, in an embodiment, mobile device 100, which may also be referred to as a UE (or user equipment), may include a general-purpose processor 210. The general-purpose processor 210 may sometimes be referred to by other names such as an applications processor, a general processor, a main processor or a processor. Various functionality may run on the general-purpose processor 210 such as applications, operating system functions and general mobile device functions. General-purpose processor 210 may also include processors, including additional processors, that perform more specialized functionality, or parts thereof, such as processing related to camera sensors, video, audio and wireless signal processing such as wireless baseband processors. In an embodiment, mobile device 100 may also include a DSP 220, which may be used for various compute processing tasks such as video and graphical processing, image processing, facial identification, feature matching, scene matching, display management, GNSS signal processing, WAN signal processing, Wi-Fi signal processing and PAN signal processing. Some tasks may, in some embodiments, be split between the general-purpose processor and one or more DSPs such as location determination, where signal search, processing and correlation may happen at the DSP level while location determination may be calculated at the general-purpose processor 210.

In mobile device 100, wireless transceiver(s) such as WAN wireless transceiver 230, and WAN antenna 232, may support various wide area network (WAN) connections (e.g., Global System for Mobile Communications (GSM), Code Division Multiple Access (CDMA), Wideband CDMA (WCDMA), Long Term Evolution (LTE), $5^{th}$ Generation Wireless (5G) or new radio access technology (NR), High Rate Packet Data (HRPD)) or combinations thereof. Wireless transceiver(s) 230 may be implemented by multi-mode transceivers, discrete transceivers, separate or shared antennas (232) or various combinations thereof. In mobile device 100, wireless transceiver(s) such as WLAN and/or PAN wireless transceiver 240, and WLAN and/or PAN antenna 245, may support various wireless local area network (WLAN) and personal area network (PAN) connections (e.g., wireless LAN connections (e.g., Wi-Fi/802.11) and personal area network (PAN) connections (e.g., Bluetooth and ZigBee), near field communication (NFC, sometimes known as contactless (CTLS) or CTLS NFC) or combinations thereof. Wireless transceiver(s) 240 may be implemented by multi-mode transceivers, discrete transceivers, separate or shared antennas (245) or various combinations thereof.

Mobile device 100 may contain a GNSS receiver (270) and GNSS antenna 272. The GNSS receiver 270 may measure various signals 274 received from satellites belonging to an SPS or Global Navigation Satellite System (GNSS) such as GPS, GLONASS, Galileo and/or Beidou. These signal measurements may be utilized to determine location either alone or in combination with terrestrial signals such as WAN, WLAN and PAN signals.

Mobile device 100 may include various sensors and may, in some embodiments be discrete or in some embodiments, be integrated into a sensor subsystem. Sensors may include, in various embodiments, accelerometers such as 3D accelerometers, gyros such as 3D gyros, and magnetometers, often used alone or in combination to determine dead reckoning output such as heading, distance, and orientation. Sensors may be used, in an embodiment to determine velocity and acceleration and/or used to determine step count and gait. Other sensors, in an embodiment, may include camera sensors, light sensors, and pressure sensors or other altimeters or other sensor types such as medical and chemical sensors.

Mobile device 100 may include a display. In some embodiments, the display may be a touchscreen, used for both visual output and touch-driven input. The display be associated with a virtual keyboard on the display, sometimes on demand, or by an actual keyboard, for character input. Mobile device 100 may include a camera 280, which, in various embodiments, may be used to capture photos of the user of mobile device 100, and the environment surrounding the mobile device 100 and, in some embodiments, the transport vehicle. In an embodiment, photos may be used for image matching, facial identification/matching, environment or landmark recognition and/or matching, and feature identification/matching, either implemented on the mobile device 100, on transport vehicle 180 or on dispatch server 140. Mobile device 100 may also include memory 260, which may comprise FLASH, RAM, ROM, disc drive, or FLASH card or other memory devices or various combinations thereof. In an embodiment, memory 260 may contain instructions to implement various methods described throughout this description. In an embodiment, memory may contain instructions for requesting a transport vehicle 180 and for identifying the mobile device 100 and/or mobile device user to the transport vehicle 180.

Figure 3:
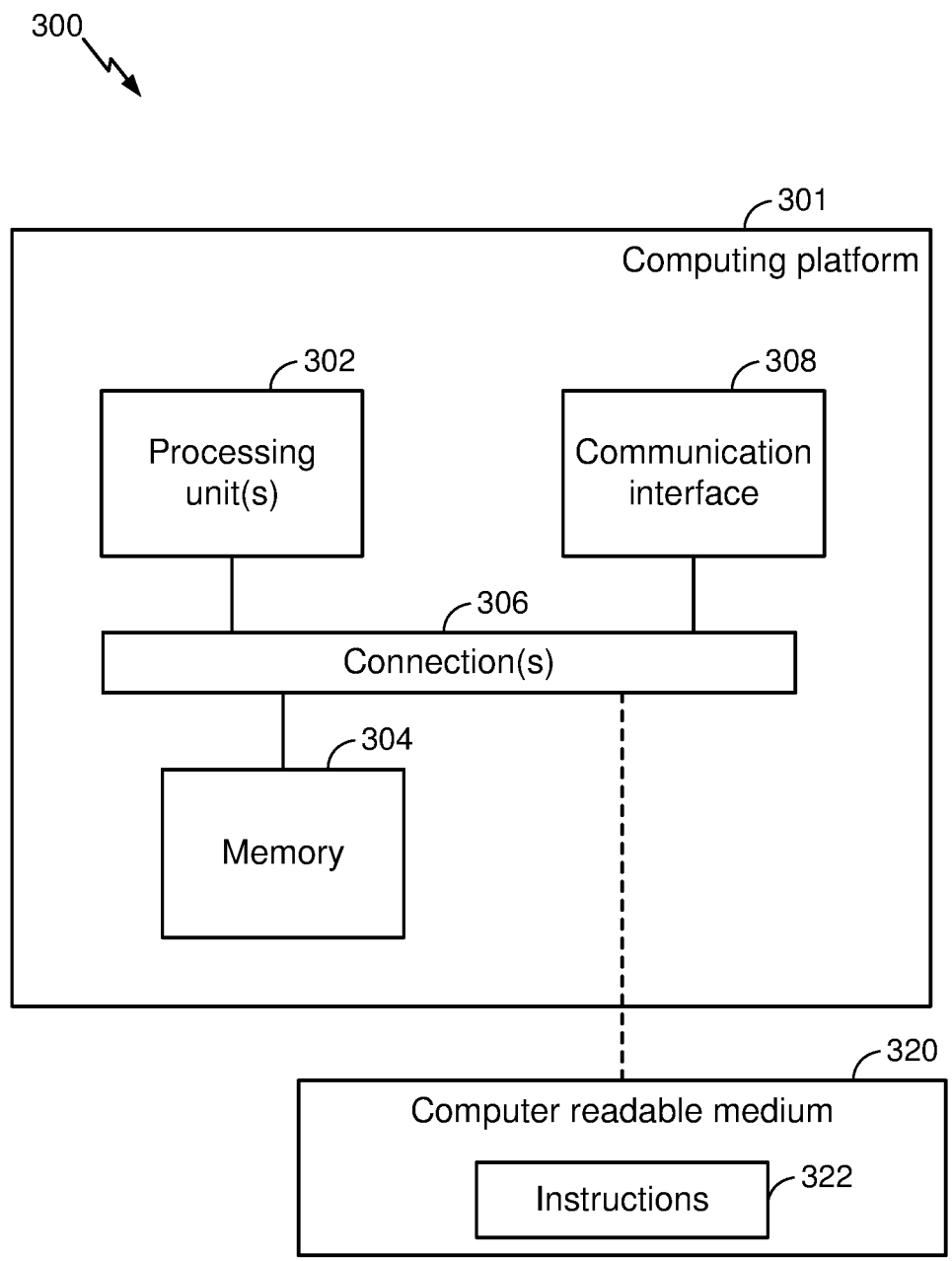
FIG. 3 is an exemplary network-based server, as may be used for a dispatch server, a location server, a route and/or navigation server or other network-based server.

FIG. 3 illustrates a server as a non-limiting example of means for implementing the methods and techniques described herein. Referring to FIG. 3, in an embodiment, the servers 140, 150 and 160 and other network based servers, may use the computing platform 301 embodiment of FIG. 3. The computing platform may comprise one or more processors, here, processing unit(s) (302) comprising one or more general purpose processors, special processors such as graphics processors and/or communications processors or baseband processors. Computing platform 301 will include at least one communication interface 308 to send communications over network 170. The communication interface 308 may comprise a network interface card or cards or other interface for interfacing to an Intranet and/or Internet over network 170. Communication interface 308 may also comprise, in some embodiments, a wireless interface or interfaces such as WAN, WLAN and Bluetooth wireless interfaces. The computing platform may also comprise various memory (304), such as Cache, RAM, ROM, disc, and FLASH memory. In an embodiment, Computing platform 301 may also access computer readable medium 320 such as hard disk drives, tape drives, flash drives and other memory devices.

Figure 4:
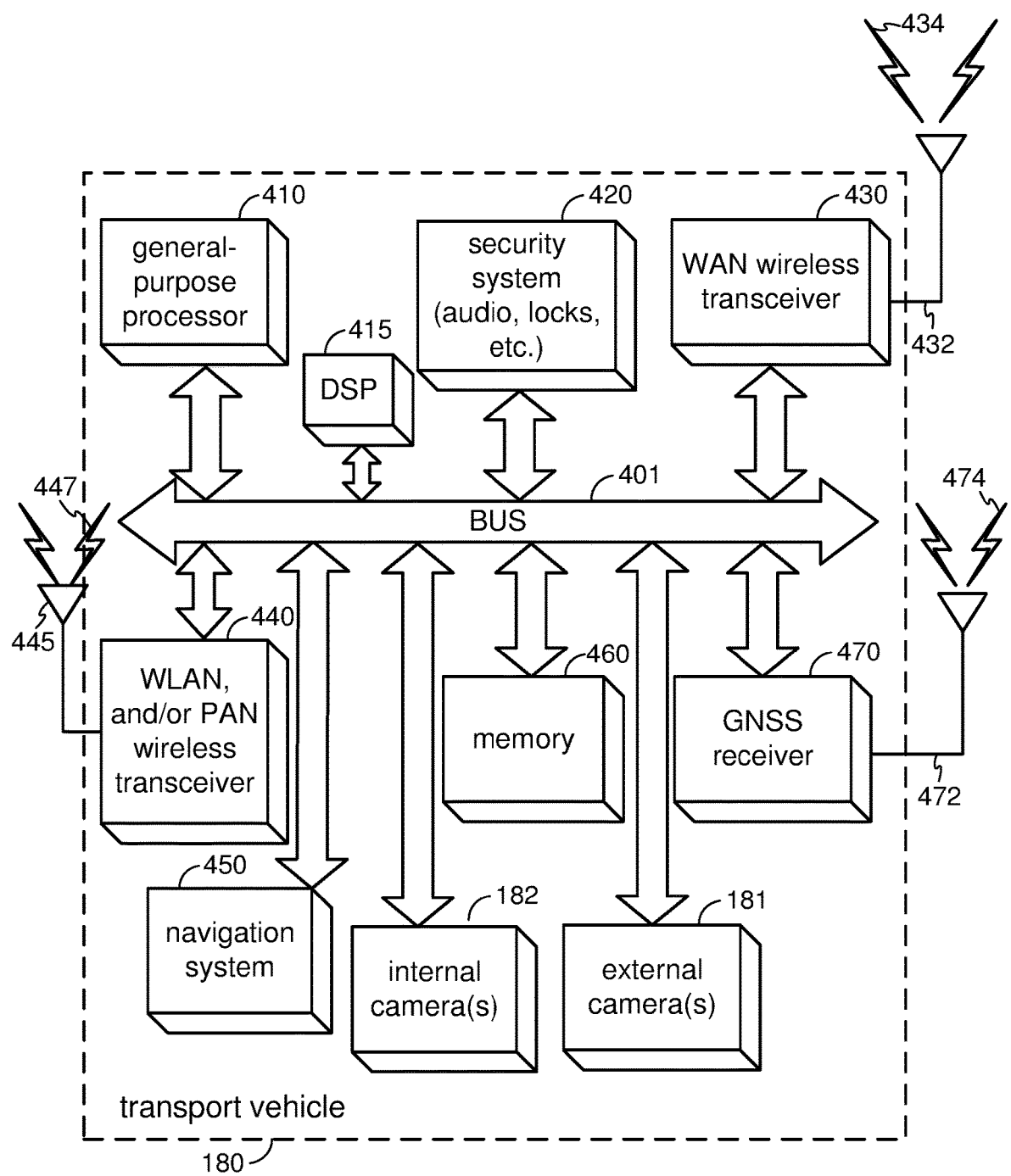
FIG. 4 is an exemplary transport vehicle capable of sending and receiving wireless signals, of navigating to a mobile device and of providing controlled access.

FIG. 4 illustrates an embodiment of a transport vehicle 180, or part thereof, as a non-limiting example for implementing the various methods and techniques illustrated in the figures and text herein. In an embodiment, the device of FIG. 4 may be separate from but communicatively coupled to and located aboard the transport vehicle such as a dashboard device, an attachable device or a mobile device placed within the transport vehicle. In an embodiment, the communicative coupling could include wires, cables or wireless connections or combinations thereof or other apparatus for executing communication techniques such as light or sound-based communication techniques. As shown in FIG. 4, in an embodiment, transport vehicle 180 may include a general-purpose processor 410. The general-purpose processor 410 may sometimes be referred to by other names such as an applications processor, a general processor, a main processor or a processor. Various functionality may run on the general-purpose processor 410 such as applications, operating system functions and general mobile device functions. General-purpose processor 410 may also include processors, including additional processors, that perform more specialized functionality, or parts thereof, such as processing related to camera sensors, video, audio and wireless signal processing such as wireless baseband processors. In an embodiment, transport vehicle 180 may also include a DSP 415 which may be used for various compute processing tasks such as video and graphical processing, image processing, facial identification, feature matching, scene matching, display management, GNSS signal processing, WAN signal processing, Wi-Fi signal processing and PAN signal processing. Some tasks may, in some embodiments, be split between the general-purpose processor and one or more DSPs such as location determination, where signal search, processing and correlation may happen at the DSP level while location determination may be calculated at the general-purpose processor 210.

In transport vehicle 180, wireless transceiver(s) such as WAN wireless transceiver 430, and WAN antenna 432, may support various wide area network (WAN) connections (e.g., Global System for Mobile Communications (GSM), Code Division Multiple Access (CDMA), Wideband CDMA (WCDMA), Long Term Evolution (LTE), $5^{th}$ Generation Wireless (5G) or new radio access technology (NR), High Rate Packet Data (HRPD)) or combinations thereof. Wireless transceiver(s) 430 may be implemented by multi-mode transceivers, discrete transceivers, separate or shared antennas (432) or various combinations thereof. In transport vehicle 180, wireless transceiver(s) such as WLAN and/or PAN wireless transceiver 440, and WLAN and/or PAN antenna 445, may support various wireless local area network (WLAN) and personal area network (PAN) connections (e.g., wireless LAN connections (e.g., Wi-Fi/802.11) and personal area network (PAN) connections (e.g., Bluetooth and ZigBee), near field communication (NFC, sometimes known as contactless (CTLS) or CTLS NFC) or combinations thereof. Wireless transceiver(s) 440 may be implemented by multi-mode transceivers, discrete transceivers, separate or shared antennas (445) or various combinations thereof.

Transport vehicle 180 may contain a GNSS receiver (470) and GNSS antenna 472. The GNSS receiver 470 may measure various signals 474 received from satellites belonging to an SPS or Global Navigation Satellite System (GNSS) such as GPS, GLONASS, Galileo and/or Beidou. These signal measurements may be utilized to determine location either alone or in combination with terrestrial signals such as WAN, WLAN and PAN signals.

Transport vehicle 180 may include various sensors and may, in some embodiments be discrete or in some embodiments, be integrated into a sensor subsystem. Sensors may include, in various embodiments, accelerometers such as 3D accelerometers, gyros such as 3D gyros, and magnetometers, often used alone or in combination to determine dead reckoning output such as heading, distance, and orientation. Sensors may be used, in an embodiment to determine velocity and acceleration and/or used to determine step count and gait. Other sensors, in an embodiment, may include camera sensors, light sensors, and pressure sensors or other altimeters or other sensor types such as medical and chemical sensors.

Transport vehicle 180 may include one or more internal cameras 182 and one or more external cameras 181, which, in various embodiments, may be used to capture photos of the passenger or potential passenger 190 of transport vehicle 180 (for example, using internal camera(s) 182 as a potential passenger 190 approaches the window of the transport vehicle 180 or enters the door of the transport vehicle 180), and the environment surrounding the transport vehicle 180 (for example, using external camera(s) 181, as may be compared to photos of the environment surrounding the mobile device 100 for a match. In an embodiment, photos may be used for image matching, facial identification/matching, environment or landmark recognition and/or matching, and feature identification/matching, either implemented on the mobile device 100, on transport vehicle 180 or on dispatch server 140. Transport vehicle 180 may also include memory 460, which may comprise FLASH, RAM, ROM, disc drive, or FLASH card or other memory devices or various combinations thereof. In an embodiment, memory 460 may contain instructions to implement various methods described throughout this description. In an embodiment, memory may contain instructions for responding to a request for a transport vehicle 180 and for identifying the passenger or potential passenger 190 and/or mobile device user to the transport vehicle 180.

Transport vehicle 180, in an embodiment, may contain a security system 420 that controls audio alerts and warnings, locking systems for doors, passenger entry and exit and/or police notification. Security system 420 may be utilized in conjunction with internal camera(s) 182 and/or external camera(s) 181, and in conjunction with general-purpose processor 410 and/or DSP 415 to determine whether photos of potential passengers, as relayed from dispatch server 140, match photos of potential passenger(s) 190, as captured by external camera(s) 181 and/or internal camera(s) 182. In an embodiment, a match between photo of a potential passenger(s) 190 relayed from a dispatch sever 140 and a photo of a potential passenger(s) 190 captured by the external camera(s) 181 and/or internal camera(s) 182 may be used to trigger navigation of the transport vehicle 180 to a position adjacent to the potential passenger(s) 190 for a passenger pickup.

In an embodiment, navigation system 450 may direct the transport vehicle 180 from its current location to the location of the potential passenger(s) 190 received from the dispatch sever 140 or to a position nearby from which either a beacon from mobile device 100 may be detected via WLAN and/or PAN wireless transceiver 440 or via WAN wireless transceiver 430 or from which external camera(s) 181 may take a photo of potential passenger(s) 190 that may be matched to a photo of potential passenger(s) 190 received from the dispatch sever 140. In an embodiment, navigation system 450 may direct the transport vehicle 180 from the location of the potential passenger(s) 190 received from the dispatch sever 140 to the potential passenger 190 as detected by the external camera 181.

Figure 5:
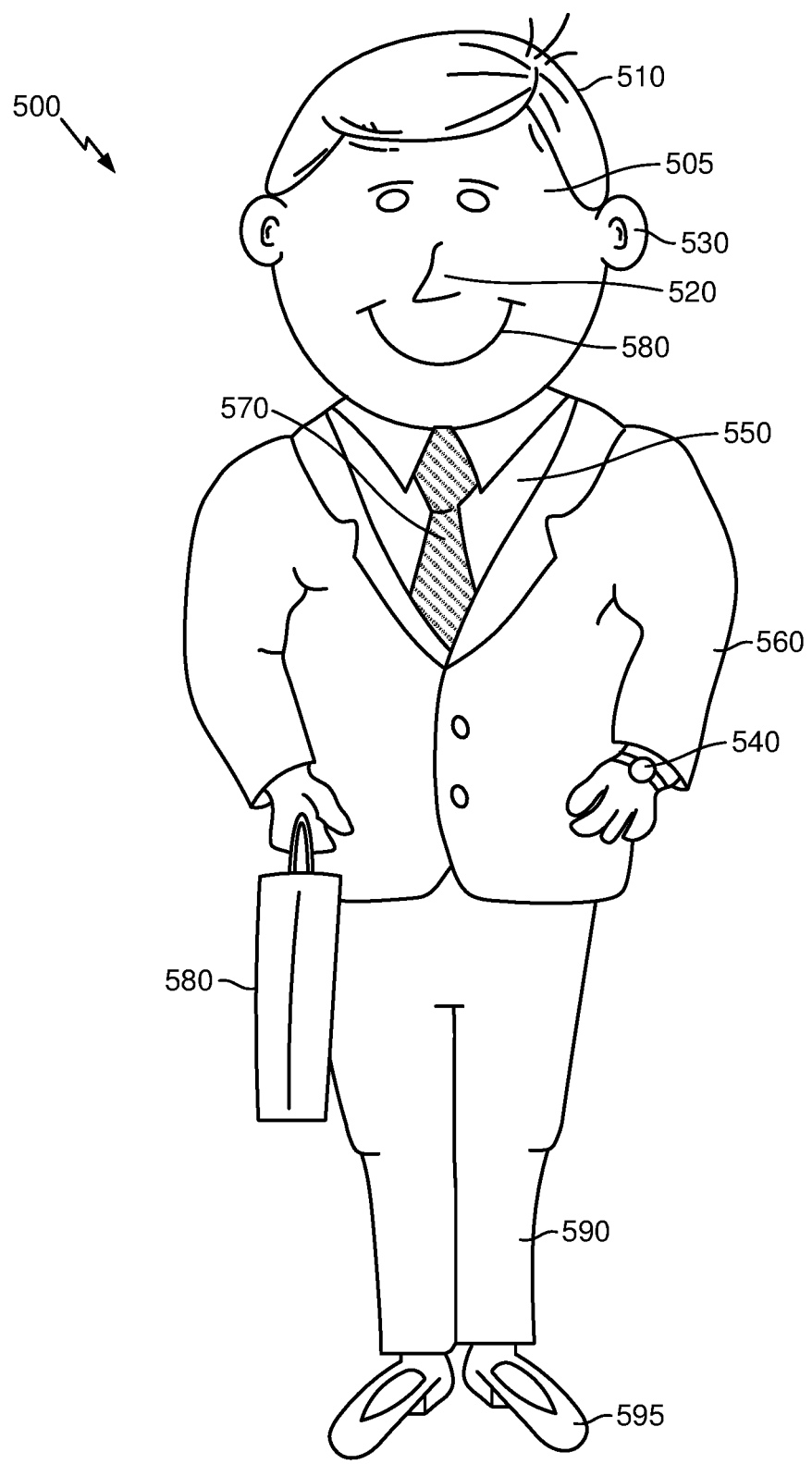
FIG. 5 illustrates a photo of a passenger or potential passenger on a transport vehicle.

FIG. 5 illustrates an embodiment of a photo of a potential passenger 190. In an embodiment, determining a match between a photo of a potential passenger 190 received from the dispatch sever 140 and a photo of a potential passenger 190 as captured by the external camera(s) 181 or the internal camera(s) 182, coarse features such as shirt, pants, coat and hat color, height, relative height, hair color, face shape, or other features of the potential passenger 190 can be used for initial identification. In an embodiment, fine features such as points on the face, infrared facial profile, facial identification markers and/or other facial features may be used for a higher reliability identification. The photo of the potential passenger 190 is captured at mobile device 100 at the time that the transport vehicle 180 is requested, or in the case of a scheduled pickup, at the time of pickup or shortly before pickup, or, in any case, recently enough that the potential passenger 190 is consistent with the photo of the potential passenger in most details. Particularly when identifying the potential passenger from a distance (e.g., using external camera 181, for example to determine which potential passenger to navigate to), coarse features such as skin tone 505, hair color 510, clothing color(s) (550, 560, 570, 590) may be utilized to identify the potential passenger 190. In the case of close matches, mobile device 100 (e.g., phone, watch, etc.) may issue a wireless beacon or a light beacon to identify the potential passenger 190 from among visually similar targets. In an embodiment, the transport vehicle 180 may request, via mobile device 100, that the potential passenger 190 proceed to the car or make a particular gesture such as a wave so that the car and identify the correct potential passenger 190 and proceed to the correct potential passenger 190. When identifying the potential passenger from a short distance (for example, for secure entry authorization and transport vehicle 180 door unlock), such as with internal camera(s) 182, for purposes of entry control, finer features may be utilized, such as the distance between features and points on the face (e.g., ears 530, nose 520, points on the mouth 580, etc.) or full facial recognition may be performed, possibly even utilizing alternative lighting such as infrared lighting to enhance feature and liveness detection. In the latter case, the image information provided by mobile device 100 may include additional facial recognition information such as infrared image information.

Figure 6:
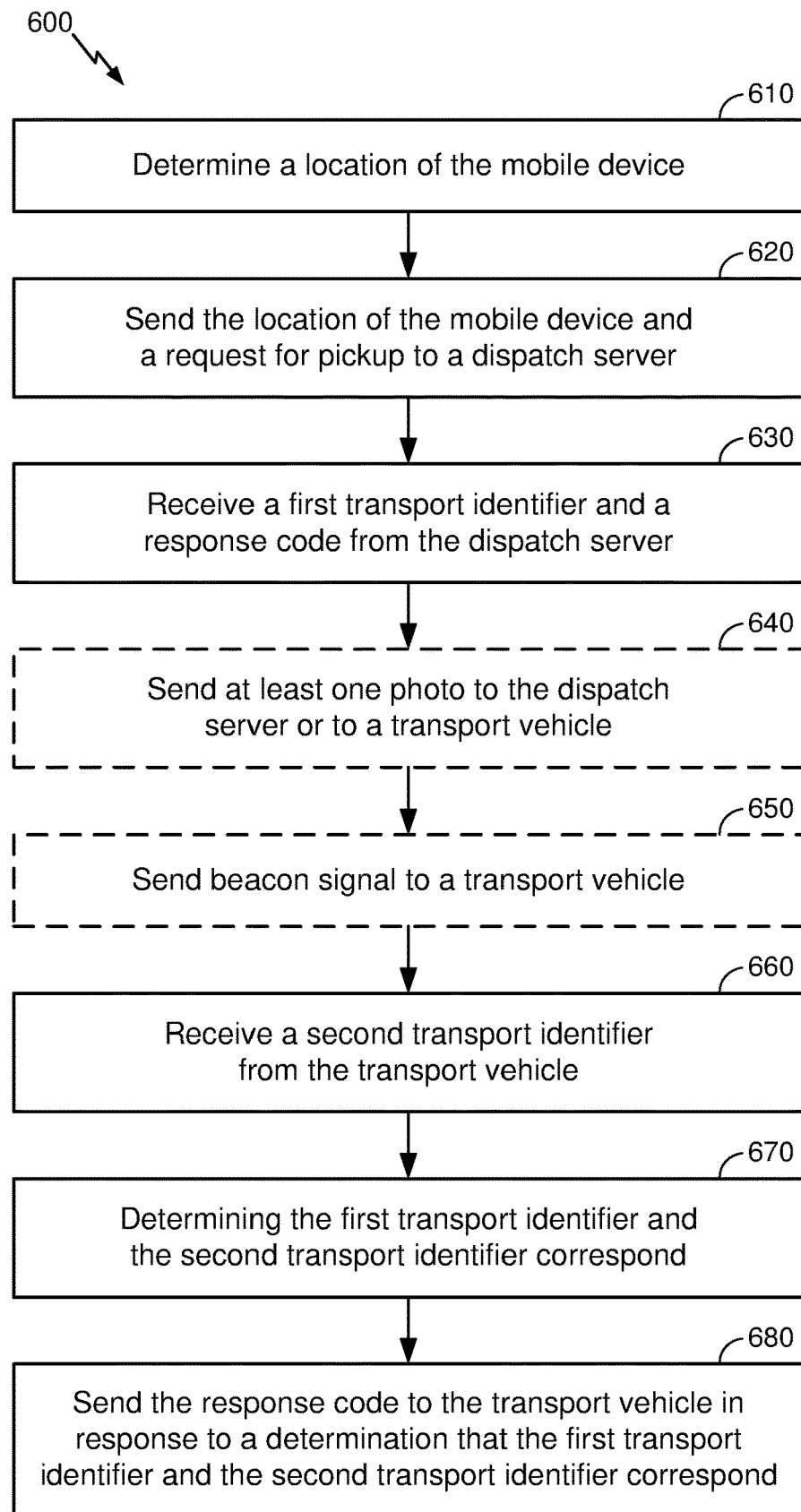
FIG. 6 illustrates an embodiment for requesting a transport vehicle on a mobile device.

FIG. 6 illustrates a method and technique 600 for requesting a transport vehicle on a mobile device. In an embodiment, in step 610, the mobile device 100 determines a location of the mobile device 100. In various embodiments, the location of the mobile device may be determined through a mobile-based technique such as GNSS or through the use of terrestrial transceivers, through a server-based technique where the mobile measures and sends ranging information from various transceivers to a server which calculates the location, for example, at location server 160 or at dispatch server 140 or combination thereof, or through input from an input device such as touchscreen display 250, a keypad, voice recognition or other input means. In an embodiment, the mobile device 100 may receive GNSS signals 274 received at antenna 272 and GNSS receiver 270 and calculate location using DSP 220 and/or general-purpose processor 210. In an embodiment, the mobile device 100 may receive WAN signals 234 received using antenna 232 and WAN wireless transceiver 230 and/or WLAN and/or PAN wireless signals 247 using antenna 245 and WLAN and/or PAN wireless transceiver 240 and calculate location using DSP 220 and/or general-purpose processor 210. In an embodiment, mobile device 100 may combine ranges from GNSS, WAN, WLAN or PAN or various combinations thereof. In an embodiment, assistance data such as a base station almanac may be received from a server such as location server 160 or a crowd source server. In an embodiment, GNSS assistance such as long-term ephemeris, ephemeris or satellite almanac data may be received from a location server 160. In an embodiment, a base station almanac may provide locations and identifiers for terrestrial transceivers utilized for determining ranges in combination with received signals from terrestrial transceivers such as wide area network (WAN) wireless transceiver 120, WLAN and/or PAN wireless local transceiver 130, which may be used with signal measurements from WAN, WLAN and PAN transceivers to determine ranges to the mobile device 100 and the location of mobile device 100. Similarly, GNSS assistance may be utilized with GNSS signal measurements to determine location of the mobile device.

In an embodiment, in step 620, the mobile device 100 sends the location of mobile device 100 and a request for pickup to dispatch server 140. In an embodiment, the location of mobile device 100 includes a latitude, a longitude. In an embodiment, the location of mobile device 100 includes an error estimate. In an embodiment, the location of mobile device 100 includes a street address. In an embodiment, the request for pickup may be sent through various means such as through WAN wireless transceiver 230 or through WLAN and/or PAN wireless transceiver 240. Dispatch server 140 receives requests for pickup from various mobile devices 100 and assigns transport vehicle 180 to requests for pickup from mobile device 100 based on proximity to mobile device 100, availability to provide a ride to potential passenger 190, ability to satisfy additional requests such as additional passengers and/or luggage, requested destination, distance between requested destination and transport vehicle home base, or estimated time of arrival at mobile device 100 or various combinations thereof. In an embodiment, the request for pickup includes requested destination. In an embodiment, the request for pickup includes total number of passengers. In an embodiment, the request for pickup includes amount of luggage.

In an embodiment, in step 630, the mobile device 100 receives a first transport identifier, for transport vehicle 180, and a response code, used to identify and/or authenticate the potential passenger 190 to the transport vehicle 180, from the dispatch server 140;

In an embodiment, in optional step 640, mobile device 100 sends at least one photo to the dispatch sever 140 or to transport vehicle 180. In an embodiment, the at least one photo may of potential passenger(s) 190, or of the environment around potential passenger(s) 190 or both. In an embodiment, the at least one photo may include photo updates of location of the mobile device 100 and/or potential passenger(s) 190. The at least one photo may be utilized, in an embodiment, to control entry to transport vehicle 180, based upon a comparison between a photo of potential passenger 190 sent by mobile device 100 and a photo of potential passenger 190 by external camera 181 or internal camera(s) 182. In an embodiment, if the photo of potential passenger 190 sent by mobile device 100 and the photo of potential passenger 190 by external camera 181 or internal camera(s) 182 matches, or features of the photo such as facial and/or clothing features match, security system 420 on transport vehicle 180 unlocks the doors or other provides access to transport vehicle 180 to potential passenger 190. The at least one photo may be utilized, in an embodiment, to determine location of potential passenger 190 by matching the surrounding environment in a photo sent by mobile device 100, either directly to transport vehicle 180 or via dispatch sever 140 to transport vehicle 180, to the environment near the location sent by mobile device 100 to the dispatch server.

Matching the environment and/or background in a photo sent by the mobile device 100 may be utilized, for example, by the transport vehicle or device communicatively coupled to the transport vehicle, in an embodiment, to determine a more accurate location of mobile device 100 and potential passenger 190. Matching the environment and/or background in a photo sent by the mobile device 100 may be utilized, in an embodiment, to select between multiple potential passengers 190, selecting the potential passenger with the closest match to the background and/or environment in the photo sent by the mobile device to transport vehicle 180, either directly, or via the dispatch sever 140. The at least one photo may be utilized, in an embodiment, to determine a match or potential match between the photo of potential passenger 190, or features thereof such as clothing, possessions or facial and body features thereof, sent by the mobile device and a potential passenger in a photo captured by a camera on the transport vehicle 180 which may then be used to navigate the transport vehicle 180 to the potential passenger 190. These methods and similar methods may be utilized to navigate the transport vehicle 180 to the potential passenger 190 in the event that the location sent from the mobile device 100 is inaccurate or in the event that the potential passenger 190 has moved to a new location or is otherwise not at the location sent from the mobile device 100 to the dispatch server 140. In an embodiment, the mobile device 100 may send one or more location updates directly to the transport vehicle 180 or to the transport vehicle via the dispatch server to the transport vehicle 180 to guide the transport vehicle to the current location of the potential passenger 190.

In an embodiment, in optional step 650, mobile device 100 sends a beacon signal to transport vehicle 180 to guide the transport vehicle to the current location of the potential passenger 190. In an embodiment, the beacon signal may be triggered by receiving a message that the transport is nearing the location of the mobile device received from the dispatch server 140. In an embodiment, the beacon signal may be triggered by receiving the second transport identifier from the transport vehicle; i.e., illustrated option step 650 would occur after, and in response to step 660, as opposed to before step 660 as illustrated. In an embodiment, step 650 may occur at other points in method 600 and/or be triggered by alternative triggers, such as step 670. In an embodiment, step 680, sending the response code to the transport vehicle, may be implemented as a beacon containing the response code, thereby eliminating the need for step 650. In an embodiment, transport vehicle 180, particularly if the location sent to the dispatch server 140 by the mobile device 100 was inaccurate, or if the potential passenger 190 has moved, uses the beacon signal to navigate closer to potential passenger 190. In an embodiment, the beacon signal may have an identifier to identify and/or differentiate mobile device 100 and potential passenger 190 from other mobile devices 100 and potential passengers 190. In an embodiment, the beacon identifier may be provided by the dispatch sever 140 to the mobile device 100 and/or transport vehicle 180. In an embodiment, the beacon may be based on an identifier for mobile device 100 or based on an identifier for transport vehicle 180; for example, the mobile device could transmit a beacon based upon the ID of the transport vehicle, provided by the dispatch server to the mobile device in an acknowledgement to the request, and the transport vehicle 180 could home in on the beacon based upon the transport vehicle ID. In an embodiment, the mobile device could transmit a beacon based upon a mobile device identifier such as an international mobile subscriber identity (IMSI); the transport vehicle 180 would be provided the mobile device identifier such as an IMSI or derivative thereof, such that the transport vehicle 180 could home in on a beacon containing the mobile device identifier or derivative thereof. In an embodiment, if multiple potential passengers 190, each with a mobile device 100, transmit beacons in proximity to each other, the transport vehicle 180 assigned to a particular potential passenger may home in to the correct potential passenger 190 based upon the code or identifier contained in the beacon.

In an embodiment, in step 660, mobile device 100 receives a second transport identifier from the transport vehicle. In an embodiment, the transport identifier may be received using a WLAN and/or PAN wireless transceiver 240 and antenna 245 once the transport vehicle 180 is in proximity to mobile device 100. In an embodiment, the transport identifier may be received using a peer to peer wireless transceiver implemented using WAN wireless transceiver 230 and antenna 232 or other means, for example using a 5G WAN and peer-to-peer-capable transceiver, in which case WAN wireless transceiver 230 may be utilized as both a WAN and a peer-to-peer wireless transceiver. The transport identifier is used by the mobile device to verify that that transport is indeed the transport that was assigned to mobile device 100 and potential passenger 190 by dispatch server 140. If, for example due to exigent circumstances such as a transport breakdown or accident, a new transport is assigned to mobile device 100, a message will be sent from dispatch server 140 to mobile device 100 with the identity of the new transport vehicle 180 and notification of the vehicle change.

In an embodiment, in step 670, mobile device 100 determines that the first transport identifier, as received from the dispatch server, and the second transport identifier, as received from the transport vehicle, correspond. It is understood that corresponding may comprise matching between the first transport identifier and the second transport identifier, or containing some relationship between the first transport identifier and the second transport identifier, such as the second transport identifier being a derivative of the first transport identifier or, the second transport identifier being an encoded form of the first transport identifier or the second transport identifier being based on the first transport identifier, or vice versa. This step provides security to mobile device 100, to prevent pickup by a rogue transport vehicle for kidnapping, theft, or other nefarious purposes.

In an embodiment, in step 680, mobile device 100 sends the response code to the transport vehicle 180, verifying that mobile device 100 is assigned to transport vehicle 180, preventing interlopers from commandeering a transport and preventing unidentified vandals from accessing transport vehicle 180. In an embodiment, in step 680, the response code is sent in response to a determination that the first transport identifier and the second transport identifier correspond. In an embodiment, receipt of the response code by WLAN and/or PAN wireless transceiver 440 causes, at least in part, security system 420 to unlock the doors for potential passenger 190, carrying mobile device 100. In an embodiment, receipt of a signal containing the response code by WLAN and/or PAN wireless transceiver 440 and exceeding a threshold signal strength causes, at least in part, security system 420 to unlock the doors for potential passenger 190, carrying mobile device 100. In an embodiment, sending the response code may be implemented as a beacon, enabling transport vehicle 180 to navigate to the location of potential passenger 190. In an embodiment, the transport vehicle 180 may use the signal strength of the signal containing the response code, wherein the signal may be a beacon or may be intermittent, exceeding a threshold signal strength to determine that the door(s) to transport vehicle 180 should be unlocked, and may use security system 420 or other means or code, using general purpose processor 210, to do so.

Figure 7:
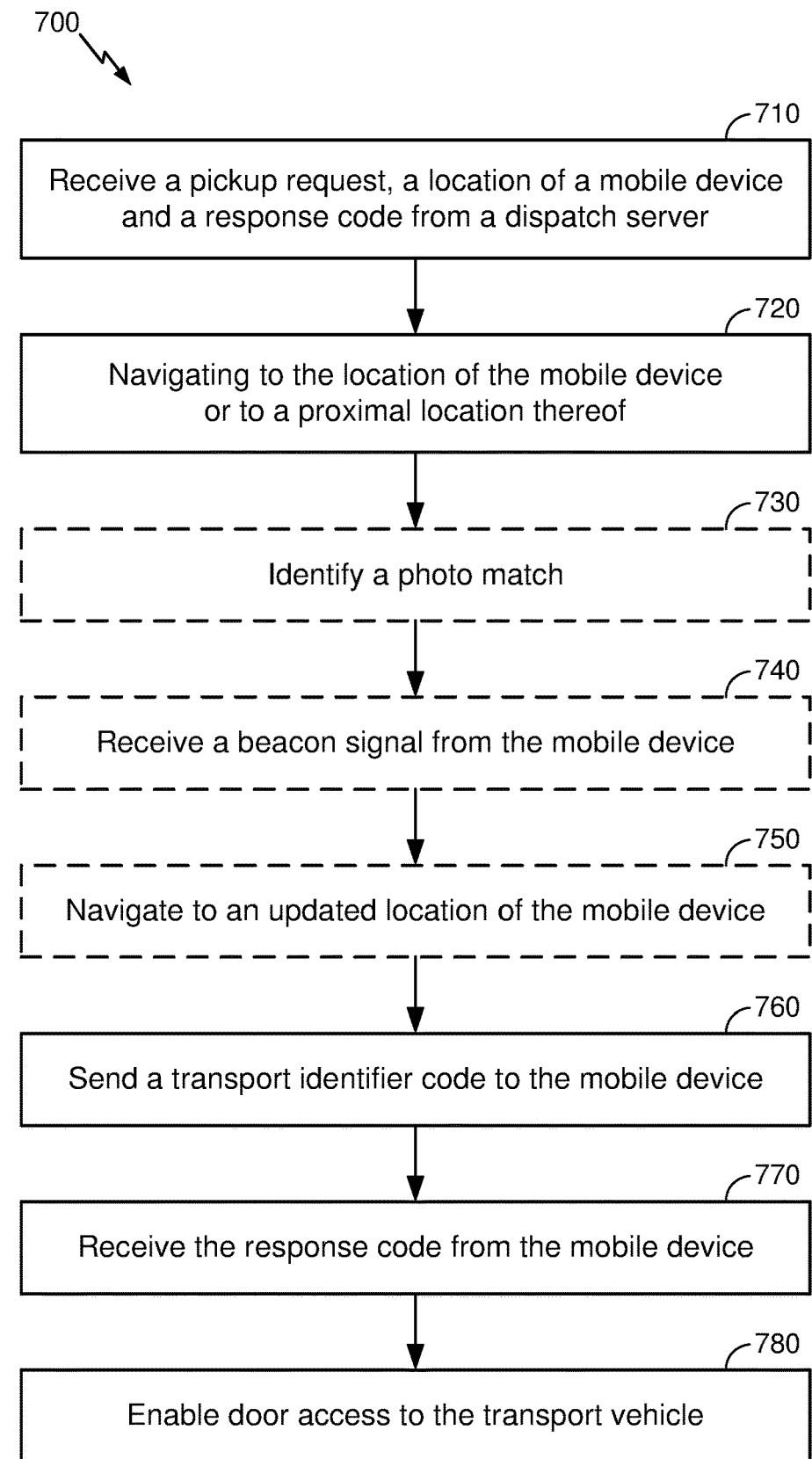
FIG. 7 illustrates an embodiment for responding to a mobile device pickup request, on a transport vehicle.

FIG. 7 illustrates a method and technique 700, on a transport vehicle 180, for responding to a pickup request from a mobile device 100. In an embodiment, the transport vehicle 180 may be driverless. In an embodiment, the transport vehicle 180 is able to identify potential passenger 190 and/or navigate to potential passenger 190, even if the initial location received from mobile device 100 is inaccurate. In an embodiment, the transport vehicle performs the steps of method 700. In an embodiment, an installable device or a mobile device within a transport vehicle may perform some or all of the elements of method 700.

In an embodiment, in step 710, transport vehicle 180 receives a pickup request, a location of mobile device 100 and a response code from a dispatch server 140. In an embodiment, the transport vehicle 180 also receives a requested destination. In an embodiment, the response code is used to verify that the mobile device sending the response code should be granted access to transport vehicle 180, for example, using security system 420 to unlock doors or otherwise grant access to transport vehicle 180. In an embodiment, the pickup request includes one or more photos of the potential passenger 190 and/or the environment around mobile device 100. In an embodiment, the pickup request includes beacon identification information. In an embodiment, the beacon identification information may include mobile device identifying information, beacon code information or other beacon identifying information. In an embodiment, location includes latitude and longitude information. In an embodiment, location includes location error information. In an embodiment, location includes a street address.

In an embodiment, in step 720, transport vehicle 180 navigates to the location of the mobile device 100 or to a proximal location thereof. In an embodiment transport vehicle 180 calculates a route from the location where it receives the pickup request to the location of mobile device 100 provided by the dispatch server 140. In an embodiment, transport vehicle 180 is a self-driving car. In an embodiment, transport vehicle 180 is driven by a human but navigation destinations and/or instructions are determined by dispatch sever 140. In an embodiment, the route from the location where transport vehicle 180 receives the pickup request to the location of mobile device 100 is provided by the dispatch server 140.

In an embodiment, in optional step 730, transport vehicle 180 identifies a photo match. In an embodiment, the photo match is between a photo, provided by mobile device 100 either via dispatch server 140 or directly, of potential passenger 190, and a photo taken of potential passenger 190 by external camera(s) 181 or internal camera(s) 182 or both. In an embodiment, the photo match is between a photo, provided by mobile device 100 either via dispatch server 140 or directly, of the environment adjacent to potential passenger 190, and a photo taken of the environment near the location provided by the dispatch server for mobile device 100, by external camera(s) 181 or internal camera(s) 182 or both. In an embodiment, the photo match is used to determine an updated location of mobile device 100 and potential passenger 190. In an embodiment, transport vehicle 180 uses the updated location of mobile device 100 to determine the route to potential passenger 190 for pickup.

In an embodiment, in optional step 740, transport vehicle 180 receives a beacon signal from mobile device 100. In an embodiment, transport vehicle 180 uses a directional antenna to determine the direction to navigate towards to reach the potential passenger 190. In an embodiment, transport vehicle 180 uses signal strength or time delay of the beacon signal to determine proximity between the transport vehicle 180 and mobile device 100. In an embodiment, transport vehicle 180 uses a beacon signal containing an identifier or other code transmitted from mobile device 100 to determine which potential passenger to pick up.

In an embodiment, in optional step 750, transport vehicle 180 navigates to an updated location of the mobile device. In an embodiment, the transport vehicle 180 uses a photo of potential passenger 190 and external camera 181 to navigate to the user. In an embodiment, the transport vehicle 180 uses a photo of the environment next to potential passenger 190 and external camera 181 to navigate to the user. In an embodiment, the transport vehicle 180 uses a photo of the environment next to potential passenger 190 to determine an updated location of potential passenger 190.

In an embodiment, in step 760, transport vehicle 180 sends a transport identifier code to the mobile device. In an embodiment, the mobile device uses the transport identifier code to verify that the transport vehicle 180 is the vehicle sent by dispatch server 140. In an embodiment, the transport identifier code is sent using a WLAN and/or PAN wireless transceiver 240 and antenna 245 directly to mobile device 100.

In an embodiment, in step 770, transport vehicle 180 receives the response code from the mobile device. In an embodiment, transport vehicle 180 uses the response code to verify that the mobile device 100 is the same mobile device 100 that requested transport vehicle 180. This can be used to prevent interlopers, who did not request a transport, from taking the transport, and to prevent vandals and thieves who have not been authenticated or checked by the dispatch server 140 from gaining entry to the transport vehicle 180.

In an embodiment, in step 780, transport vehicle 180 enables door access. In an embodiment, door access is enabled by security system 420 to allow potential passenger 190 to gain entry to transport vehicle 180. In an embodiment, security system 420 verifies that a photo of potential passenger 190 taken by internal camera(s) 182 and/or external camera(s) 181 matches a photo sent by mobile device 100 of potential passenger 190.

Reference throughout this specification to "one example", "an example", "certain examples", "in an embodiment", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or "in an embodiment" or other like phrases in various places throughout this specification are not necessarily all referring to the same feature, example, and/or limitation. Furthermore, the particular features, structures, or characteristics may be combined or modified in one or more examples and/or features and across various embodiments. The specified embodiments are not intended to be limiting relative to implementations, which may vary in detail; one skilled in the art will realize that other non-specified embodiments may also be used with or to modify the described embodiments.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WAN"), a wireless local area network ("WLAN"), a wireless personal area network (PAN), and so on. The term "network" and "system" may be used interchangeably herein. A WAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, Long Term Evolution ("LTE"), Fifth Generation ("5G") or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). CDMA2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a PAN may comprise a Bluetooth network, an IEEE 802.15x, comprising a Zigbee network, for example. Wireless communication implementations described herein may also be used in connection with any combination of WAN, WLAN or PAN.

In another aspect, as previously mentioned, a wireless transmitter or access point may comprise a wireless transceiver device, utilized to extend cellular telephone service into a business or home. In such an implementation, one or more mobile devices may communicate with a wireless transceiver device via a code division multiple access ("CDMA") cellular communication protocol, for example.

Techniques described herein may be used with a satellite positioning system ("SPS") that includes any one of several global navigation satellite systems ("GNSS" such as the Global Positioning system "GPS", the Russian GLONASS system and the European Union's Gallileo system and the Chinese BeiDou and BeiDou-2 systems) and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, FLASH, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. A method, in a transport vehicle, of responding to a mobile device pickup request, comprising:
   receiving, at a first transceiver, a pickup request, a location of a mobile device and a response code from a dispatch server;
   navigating to the location of the mobile device or to a proximal location thereof;
   sending, using a second transceiver, a transport identifier code to the mobile device;
   receiving, using the second transceiver, the response code from the mobile device; and
   enabling door access to the transport vehicle.

2. The method, in the transport vehicle, of responding to a mobile device pickup request of claim 1, further comprising receiving, at the first transceiver, one or more photos, from the dispatch server, comprising a photo of one or more potential passengers or a photo of an environment near the mobile device or combination thereof.

3. The method, in the transport vehicle, of responding to a mobile device pickup request of claim 2, further comprising obtaining, using one or more cameras on the transport vehicle, one or more photos comprising a photo of one or more potential passengers or a photo of an environment near the mobile device or a combination thereof.

4. The method, in the transport vehicle, of responding to a mobile device pickup request of claim 3, further comprising:
   comparing the one or more photos, from the dispatch server and the one or more photos obtained using the one or more cameras;
   updating the location of the mobile device, based at least in part on a comparison of one or more photos from the dispatch server and the one or more photos obtained using the one or more cameras; and
   navigating to the updated location of the mobile device.

5. The method, in the transport vehicle, of responding to a mobile device pickup request of claim 1, further comprising:
   receiving, at the transport vehicle, a beacon signal from the mobile device;
   updating, by the transport vehicle, the location of the mobile device based at least in part upon the beacon signal; and
   navigating, by the transport vehicle, to the updated location of the mobile device.

6. A transport vehicle for responding to a mobile device pickup request, comprising:
   one or more processing units;
   a first wireless transceiver coupled to the one or more processing units; and
   a second wireless transceiver coupled to the one or more processing units;
   wherein the one or more processing units are configured to:
   receive, using the first wireless transceiver, a pickup request, a location of a mobile device and a response code from a dispatch server;
   navigate, using a navigation system, to the location of the mobile device or to a proximal location thereof;
   send, using the second wireless transceiver, a transport identifier code to the mobile device;
   receive, using the second wireless transceiver, the response code from the mobile device; and
   enable, using a security system on the transport vehicle, door access to the transport vehicle.

7. The transport vehicle of claim 6, wherein the one or more processing units are further configured to:
   receive one or more photos, from the dispatch server, using the first wireless transceiver, comprising a photo of one or more potential passengers or a photo of an environment near the mobile device or combination thereof; and
   obtain, using one or more cameras on the transport vehicle, one or more photos comprising a photo of one or more potential passengers or a photo of an environment near the mobile device or a combination thereof.

8. The transport vehicle of claim 7, wherein the one or more processing units are, further configured to:
   compare the one or more photos, from the dispatch server and the one or more photos obtained using the one or more cameras;
   update the location of the mobile device, based at least in part on a comparison of the one or more photos from the dispatch server and the one or more photos obtained using the one or more cameras; and
   navigate, using the navigation system, to the updated location of the mobile device.

9. The transport vehicle of claim 6, wherein the one or more processing units are further configured to:
   receive, using the second wireless transceiver, a beacon signal from the mobile device;
   update the location of the mobile device based at least in part upon the beacon signal; and
   navigate, using the navigation system, to the updated location of the mobile device.

10. A mobile device, comprising:
    means for determining a location of the mobile device;
    means for sending the location of the mobile device and a request for pickup to a dispatch server;

means for receiving a first transport identifier and a response code from the dispatch server;

means for receiving a second transport identifier from a transport vehicle;

means for determining that the first transport identifier and the second transport identifier correspond; and means for sending the response code to the transport vehicle in response to the determination that the first transport identifier and the second transport identifier correspond.

11. The mobile device of claim 10 further comprising means for sending, from the mobile device, at least one photo to the dispatch server.

12. The mobile device of claim 10, further comprising means for sending, from the mobile device, a beacon signal to the transport vehicle.

13. An apparatus on a transport vehicle for responding to a pickup request from a mobile device, comprising:

means for receiving, at a first transceiver, the pickup request, a location of the mobile device and a response code from a dispatch server;

means for navigating to the location of the mobile device or to a proximal location thereof;

means for sending, from a second transceiver, a transport identifier code to the mobile device;

means for receiving, at the second transceiver, the response code from the mobile device; and means for enabling door access to the transport vehicle.

14. The apparatus of claim 13, further comprising:

means for comparing one or more photos, from the dispatch server and one or more photos obtained using one or more cameras or means for receiving a beacon signal from the mobile device or a combination thereof; and means for updating the location of the mobile device, based at least in part on a comparison of the one or more photos from the dispatch server and the one or more photos obtained using the one or more cameras or based at least in part on the beacon signal or based on a combination thereof; and navigating to the updated location of the mobile device.

15. The apparatus of claim 13, further comprising:

means for receiving, at the transport vehicle, a beacon signal from the mobile device;

means for updating, by the transport vehicle, the location of the mobile device based at least in part upon the beacon signal; and means for navigating, by the transport vehicle, to the updated location of the mobile device.

* * * * *